Patented Apr. 1, 1941

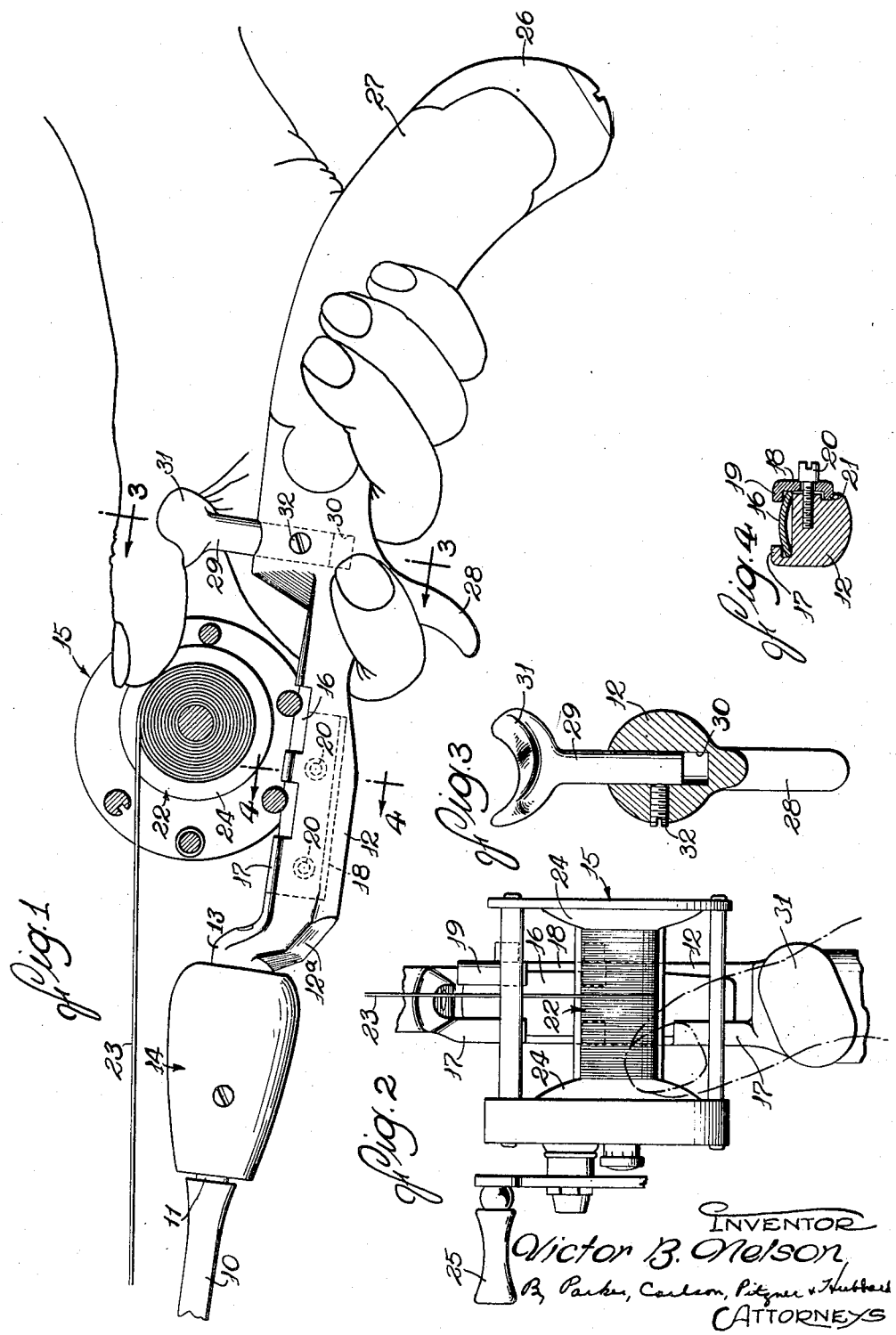

2,236,603

UNITED STATES PATENT OFFICE 2,236,603

FISHING ROD HANDLE

Victor B. Nelson, Rockford, Ill.

Application September 16, 1938, Serial No. 230,171

10 Claims. (Cl. 43—23)

The invention relates to fishing rods of the casting type and more particularly to improvements in the handles of such rods.

The general object of the present invention is to provide a fishing rod handle embodying a novel form of thumb rest adapted to be located adjacent a reel on the rod, the arrangement being of such character that the relative positions of the thumb rest and the reel may be adjusted to accommodate the thumb of either a right or left handed user in such manner that the thumb is supported for free flexure at the first joint into braking engagement with a reel irrespective of the size or dimensions of the particular reel used and without disturbing the grip of the user's hand on the rod.

Another object is to adapt the thumb rest in a novel manner to the length of the user's thumb.

The invention resides in the novel mounting of the thumb rest and associated parts which makes for simplicity in construction and ease of adjustment.

Further objects and advantages of the invention will become apparent as the following description proceeds taken in connection with the accompanying drawing, in which Figure 1 is a side elevation of a casting rod handle embodying the invention and showing the manner of its use.

Fig. 2 is a partial plan view of a handle and attached reel shown in Fig. 1 also illustrating the manner of its use.

Figs. 3 and 4 are detail sectional views respectively along the lines 3—3, and 4—4 in Fig. 1.

For purposes of illustration and explanation of its various novel features, the invention has been shown and described herein as embodied in a handle structure for a flexible casting rod 10. The rod itself may be of any suitable construction and the butt end 11 of the rod is received in and secured in any preferred manner to the tubular upper end 13 of the handle structure. The forward portion of the handle may be of any desired form and is shown herein as comprising a shank 12, preferably cast from some such light metal as aluminum, and terminating at its forward end in the cylindrical projection 13 which is connected to the shank 12 by an angularly offset neck 12ª. The usual supplemental hand grip 14 may be provided on the projection 13.

A reel, designated generally by the numeral 15, and which may be of any desired construction, is secured to the forward portion of the handle. As will hereinafter appear in greater detail, it is desirable that there be an adjustment of the relative positions of the reel and a cooperating thumb rest in a direction longitudinally of the rod handle. For this purpose, provision has been made for adjusting the position of the reel along the handle shank 12. In the particular arrangement shown (Fig. 1), the reel 15 is provided with the usual supporting saddle or base 16 comprising two elongated alined arms rigidly secured to the under side of the reel frame and projecting in opposite directions therefrom. One side edge of this base is lodged beneath lugs 17 on the top of the shank 12 (Figs. 2 and 4). The opposite side edge of the base 16 is gripped by ears 18 on the upper side of a retaining plate 19 (Fig. 4). This plate is releasably held in position on the side of the handle shank 12 by screws 20. To locate the plate and improve its gripping action, a flange 21 is formed on its lower edge and fitted in a complemental groove in the side of the shank. Consequently, the plate fulcrums about its flange 21 when the screws 20 are tightened thereby pressing the lugs 19 against the reel saddle 16 to clamp the reel tightly in position. To relocate the reel it is simply necessary to loosen the screws 20, slide the saddle 16 endwise to the desired distance, and retighten the screws. Thus none of the parts need be completely detached during the adjustment operation, so that there is no possibility that the fisherman will drop and lose them. It will be appreciated that this adjustable reel support has utility even aside from its cooperative relation with my improved thumb rest hereinafter described.

The reel 15 also includes a suitable line winding spool 22 (Fig. 2) on which a casting line 23 is wound and which presents opposed convex surfaces 24 at its opposite ends. A crank 25 having an appropriate driving connection with the reel spool serves to wind the line 23. It will be noted that a left hand reel is provided since the fisherman is able to support the rod entirely with his right hand through the use of my improved handle. Hence, he need not follow the usual practice of casting with his right hand, then pressing the rod against his body with his left hand and reeling in with his right, but can hold the rod at all times in his right hand and reel in with his left.

The grip portion of the handle structure may take various forms, but it has been found most desirable to utilize a longitudinally curved pistol grip and, accordingly, such a grip has been shown herein. This grip may, for example, be formed by an integral and suitably curved depending tail portion 26 (Fig. 1) on the shank 12 and to the opposite sides of which are fixed face plates 27 of cork or the like. In order to insure a firm gripping action by the user's hand, a projection 28 (Fig. 1) is preferably fashioned on the lower side of the center part of the shank 12. When in use, the index finger of the user's hand is pressed against the concave opposite forward side of the lug 28 so that the index finger grips the handle structure much in the manner of a trigger finger on a gun.

In accordance with one aspect of the present invention, an improved form of thumb rest has been provided by means of which the thumb of the hand gripping the rod handle can be used to exert a braking action on the reel 15. In general, the thumb rest is such that the lower portion of the thumb can be pressed tightly against it to aid in gripping the rod while the outer end of the thumb can be freely flexed at the first joint. In this way, the ball of the thumb can be pressed against either the concave end face 24 on the reel spool 22 or against the portion of the line 23 which is wound about the spool. As a result, the angler can vary the braking action on the reel with nicety and an extreme delicacy of touch without in any way impairing or relaxing his grip on the handle.

One prime virtue of the thumb rest structure herein disclosed is its adjustability to accommodate both right and left hand users as well as different sizes and shapes of reels. This adjustability is preferably accomplished by providing a thumb rest as shown which embodies a cylindrical stem 29 (Figs. 1 and 3) axially slidable in a bore 30. This bore extends transversely of the handle shank 12 and also transversely of the axis of the reel spool 22. An enlarged head 31, presenting a concave upwardly facing surface, receives the rodsman's thumb. This concave shape of the thumb rest is particularly desirable since it not only prevents lateral displacement of the thumb pressed against it but also forms a fulcrum about which the thumb may be moved horizontally to press firmly against the concave end faces 24 on the reel spool.

The thumb rest structure is held in various adjusted positions by a set screw 32 (Figs. 1 and 3) threaded in the enlarged threaded portion of the shank 12 and bearing against the thumb rest stem 29. This single set screw serves to hold the thumb rest in both its axially and angularly adjusted positions. In adjusting the thumb rest for a particular reel and user, the set screw 32 is loosened and the stem 29 is slid axially in the bore 30 until the thumb rest head 31 is at a height at which the user's thumb engages the reel spool most comfortably. In addition, the thumb rest stem 29 is swiveled angularly about its axis so that when the user grips the handle structure, his thumb will be pointed toward and in engagement with one of the end faces 24 on the reel spool. After having been thus adjusted, the set screw 32 is tightened so that the thumb rest will not become displaced.

A triple adjustment of the relative positions of the thumb rest and reel is made possible by the structure described. First, the thumb rest can be swiveled or adjusted angularly; second, it can be adjusted transversely, i. e. vertically, with respect to the rod handle and reel; and third, the relative spacing of the thumb rest and reel can be adjusted longitudinally of the rod handle. The angular adjustment described makes it possible to turn the thumb rest at an angle to accommodate the thumb of either a left or right handed user and also to position the thumb of either hand to engage the braking surface on a reel having a spool of any reasonable axial length. The vertical adjustment of the thumb rest accommodates reels of different diameters while the longitudinal adjustment of the spacing between the reel and thumb rest places the reel at just the right distance for a thumb of any particular length. If the user's thumb is long, the reel is, of course, pushed forward a greater distance than if his thumb is short. In either case, the ball or tip of the thumb is positioned at just the right point for most effective reel braking. After the thumb rest has been secured in its adjusted position as described, the rodsman can grip the handle structure very firmly with the fingers and thumb disposed, for example, as shown in Fig. 1. In this gripping action, the thumb is able to play a major part since the lower portion of the thumb can be pressed against the thumb rest without in any way interfering with the free flexure of the thumb at the first joint. It is a well known characteristic of the human hand that the thumb plays a major part in gripping actions and it is therefore desirable that it should, as nearly as possible, play its full part even though it is also to be used for braking the reel. By pressing the ball of the thumb against the reel spool as indicated, the latter can be frictionally braked exactly the amount required, since the thumb is free to flex at the first joint even when gripping. It will thus be seen that the angler's skill in casting is given free rein and he is unhampered by any awkwardness in the positioning of a single hand to not only hold the rod but also to exert a variable braking action on the reel.

Although a particular embodiment of the invention has been shown and described in some detail for purposes of illustration of its various novel features, there is no intention to thereby limit the invention to such embodiment but, on the other hand, the appended claims are intended to cover all modifications and alternative constructions within the spirit and scope of the invention.

The present application is a continuation in part of my copending application Serial No. 220,629, filed July 22, 1938.

I claim as my invention:

1. In a fishing rod, a handle grip, means for supporting a reel forwardly of said grip, a thumb rest disposed between said reel and the major portion of said grip and presenting a concave upwardly facing thumb rest surface, and means for adjusting the height of said thumb rest surface above said grip and for swiveling the same about an axis transversely to said grip to locate said concave surface adjustably to support any particular user's thumb for free flexure of the first thumb joint in bringing the thumb into braking engagement with the reel without disturbing the gripping action of the remainder of the hand.

2. In a fishing rod, a handle grip, means for supporting a reel forwardly of said grip, a thumb rest disposed between said reel supporting means and the major portion of said grip and presenting a concave upwardly facing thumb rest surface, and means for adjusting the angular position of said thumb rest surface about an axis transversely to the longitudinal axis of said grip.

3. In a fishing rod, a handle grip, means for supporting a reel forwardly of said grip, said grip having a transverse bore therein disposed transversely to the axis of a reel carried by said supporting means, a stem slidable and rotatable in said bore, a thumb rest head on said stem presenting an upwardly facing surface to support a user's thumb for braking engagement with the reel, and releasable means for holding said stem in axially and rotatably adjusted position.

4. In a fishing rod, a handle grip, means for supporting a reel forwardly of said grip, said grip having a transverse bore therein disposed transversely to the axis of a reel carried by said supporting means, a stem slidable in said bore, a thumb rest head on said stem presenting an upwardly facing surface to support a user's thumb for braking engagement with the reel, and a set screw engaging said stem for holding the same in axially adjusted position.

5. In a fishing rod, a handle grip, a reel support located forwardly of said grip, a thumb rest disposed between said reel and the major portion of said grip, and means for effecting a triple adjustment of the relative positioning of said thumb rest and reel including adjustments in spacing of said rest and reel longitudinally of said grip, the angular position of said rest about an axis transverse to said grip and reel, and the relative transverse displacements of said reel and rest from said grip.

6. The combination with a fishing rod embodying a reel supporting portion, of a reel supporting saddle positioned on said portion of said rod for longitudinal sliding movement thereon, means on said rod for engaging one side edge of said saddle, a retaining plate fulcrumed on said rod on the opposite side of said saddle and having a projection thereon overlying the opposite side edge of said saddle, and means for releasably securing said plate in position on said rod to clamp said saddle against movement.

7. In a fishing rod adapted to support a reel having an elongated base, a handle having a grip, a support on said handle located forwardly of said grip and supporting the base of the reel for endwise adjustment along the support, means for supporting the thumb of the user's hand grasping said grip in a position for engagement of said reel by the ball of the thumb, and releasable means for clamping said reel base against said support in a multiplicity of positions of endwise adjustment therealong whereby to adapt the reel position to the length of a user's thumb.

8. In a fishing rod adapted to support a reel having an elongated base, a handle having a grip, a surface on said handle disposed forwardly of said grip and supporting the base for endwise sliding adjustment along the surface, a thumb rest disposed above said grip in a position for engagement of said reel by the ball of the thumb supported on the rest, and means for clamping said base against said surface in different positions of longitudinal adjustment therealong while maintaining a fixed height of the reel relative to said rest whereby to adapt the reel position to the length of a user's thumb.

9. In a fishing rod, a handle having a grip, means for supporting a reel forwardly of said grip, a thumb rest disposed above said grip behind said reel and presenting an upwardly facing surface, and means supporting said thumb rest from said handle for vertical adjustment relative to said grip through a multiplicity of positions whereby to vary the height of said thumb rest relative to the reel and adapt the same to the size of the user's hand.

10. In a fishing rod, a handle having a grip, means for supporting a reel forwardly of said grip for bodily adjustment into a multiplicity of positions longitudinally of the handle, a thumb rest disposed above said grip behind said reel and presenting an upwardly facing surface, and means supporting said thumb rest from said handle for vertical adjustment relative to said grip whereby to vary the height of said thumb rest relative to said reel.

VICTOR B. NELSON.